UNITED STATES PATENT OFFICE.

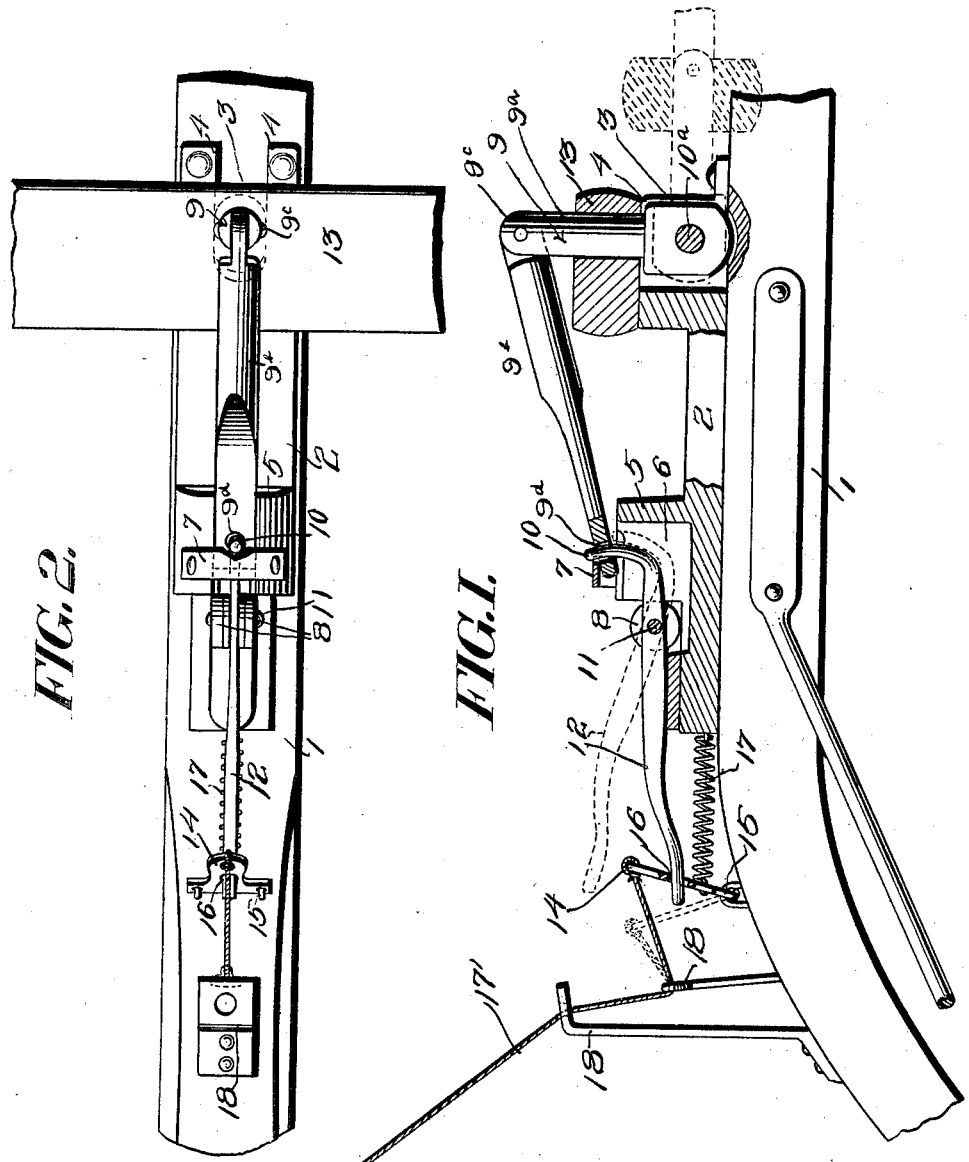

CHARLEY J. MRSNY, OF CLARKSON, NEBRASKA.

HORSE-DETACHER.

SPECIFICATION forming part of Letters Patent No. 699,846, dated May 13, 1902.

Application filed February 17, 1902. Serial No. 94,521. (No model.)

*To all whom it may concern:*

Be it known that I, CHARLEY J. MRSNY, a citizen of the United States, residing at Clarkson, in the county of Colfax and State of Nebraska, have invented a new and useful Horse-Detacher, of which the following is a specification.

My invention is an improved horse-detacher by means of which a horse or team may be instantly detached from a vehicle or a machine, such as a mowing-machine or harvester, in the event that the horse or team should become unruly or in the event that it is necessary to instantly detach a machine from a horse or team drawing the same to prevent injury to the machine; and my invention consists in the peculiar construction and combination of devices hereinafter fully set forth and claimed.

In the accompanying drawings, Figure 1 is a side elevation, partly in section, of a horse-detacher embodying my improvements. Fig. 2 is a top plan view of the same.

In the embodiment of my invention here shown, 1 is a tongue or draft-pole of a vehicle or machine of the class hereinbefore indicated, on which tongue, at a suitable distance from the rear end thereof, is secured a base-plate 2. The said base-plate is formed with a recess 3 at its front end and a pair of lugs 4, which rise from said base-plate at the sides of the said recess. Said base-plate is further provided on its upper side near its rear end with an upstanding lug 5, in which is a vertical recess 6, open at its upper and rear sides, and said lug has a stop-bar 7, which is arched over the recess 6, as shown. The said stop-bar may be formed separately from the lug and secured thereto, as here shown, or it may be formed integrally with the lug, and I do not desire to limit myself in this particular. The said base-plate 2 is further provided in rear of the lug 5 with a pair of upstanding ears 8. A coupling-pin 9 has its head disposed in the recess 3 and pivotally connected to the front portion of the base-plate by a pivot $10^a$, which operates in alined openings in the lugs 4. The said coupling-pin comprises the inner section $9^a$ and the outer section $9^b$, the latter being pivoted to the former, as at $9^c$. The pivoted outer section of the coupling-pin is provided near its outer end with an opening $9^d$, which is adapted to be engaged by a hook 10, which hook is pivotally mounted between the ears 8, as at 11, and is provided with a rearwardly-extending locking-arm 12. The engaging portion of the hook is disposed and operates in the recess 6, and when the outer pivoted section of the coupling-pin is engaged by said hook the end of said pivoted section is disposed under and engaged by the stop-bar 7. The evener-bar, doubletree, or singletree 13 is pivoted on the coupling-pin and normally is on the inner section $9^a$ thereof and bears on the upper sides of the lugs 4.

A keeper 14, which may be of any preferred form, is pivotally connected at its lower end to the tongue or pole 1, as at 15, and is provided with an opening 16 to engage the rear end of the arm 12 of hook 10. A spring 17, which is here shown as a coiled retractile spring, is connected to the base-plate 2 and the keeper 14 and keeps the latter normally in its engaged position with reference to the arm 12 of the hook, as shown in full lines in Fig. 1. A cord 17 is attached to the said keeper, passes through suitable guides 18 to a point within easy reach of the driver, and by pulling the said cord to disengage the keeper 14 from the arm 12 the draft of the horse or team on the evener-bar, doubletree, or singletree will turn the coupling-pin forwardly on its pivot $10^a$, disengage the section $9^b$ from the hook 10, and enable the evener-bar, doubletree, or singletree to slip off the coupling-pin as the latter straightens out forwardly, as indicated in dotted lines in Fig. 2, thereby instantly and effectually detaching the horse or team from the vehicle or machine, as will be understood.

While I have herein shown and described my horse-detacher as employed on a tongue, it will be understood that the same may be also employed on the cross-bar of a pair of thills, and I not limit myself in this particular.

Having thus described my invention, I claim—

1. In a horse-detacher, the combination of a pivotally-mounted flexible coupling-pin, a draft element held on and by said pin and adapted to slide from the pin when the latter is straightened out forwardly, means to engage the outer end of said pin when the same is turned rearwardly, and means to lock and release said pin-engaging means, substantially as described.

2. In a horse-detacher, the combination of a pivotally-mounted, flexible coupling-pin, a draft element pivoted thereon and adapted to be drawn therefrom when the coupling-pin is straightened out forwardly, a hook to engage the pin, to lock the latter against pivotal movement and retain the draft element thereon, a stop, coacting with the hook to maintain the engagement of the latter with the flexible pin, and a movable keeper to engage and disengage the hook, substantially as described.

3. In a horse-detacher, the combination of a pivotally-mounted coupling-pin having an outer section flexibly connected and adapted to be disposed at an angle thereto, a draft element on said pin and adapted to be drawn therefrom when said pin is turned forwardly, the said outer section of the pin having an opening, a pivotally-mounted hook to engage said opening and lock the pin in position to retain the draft element, and a movable keeper to engage and disengage said hook, substantially as described.

In testimony that I claim the foregoing as my own I have hereto affixed my signature in the presence of two witnesses.

CHARLEY J. MRSNY.

Witnesses:
LOUIS H. OSTERMAN,
ALOIS. NEMEC.